Patented Mar. 22, 1938

2,112,116

UNITED STATES PATENT OFFICE 2,112,116

PRODUCTION OF CELLULOSE FIBER OF LOW SOLUTION VISCOSITY FOR CONVERSION INTO CELLULOSE DERIVATIVES

George A. Richter, Berlin, N. H., assignor to Brown Company, Berlin, N. H., a corporation of Maine No Drawing. Application May 2, 1936, Serial No. 77,611

18 Claims. (Cl. 260—101)

This invention relates to the production of cellulose fiber of low solution viscosity for conversion into cellulose derivatives of all sorts, including cellulose xanthate, cellulose nitrate, cellulose acetate, ethyl cellulose, hydroxy ethyl cellulose, and other cellulose esters and ethers. In characterizing cellulose herein as being of low viscosity or of low solution viscosity, it is meant that cellulose derivatives prepared from the cellulose may be dissolved in the appropriate media to form solutions of low viscosity. While the solution viscosity of cellulose may be tested or measured in various ways, the solution viscosity values to be given herein are in terms of the viscosity exhibited by a cuprammonium cellulose solution prepared and tested under standard conditions for its viscosity in poises, as will hereinafter appear.

An objective of the present invention, generally stated, is to provide a process of producing low viscosity cellulose suitable for conversion into various high grade cellulose derivatives and more especially a process that lends itself to easy and economical application to cellulose fiber or pulp in the form of pulp suspension, pulpboard, and paper. Another objective is to provide a process so effective in lowering the solution viscosity of cellulose that the resulting cellulose may be xanthated substantially without ageing of alkali-cellulose prepared therefrom to yield viscose solutions satisfactory for such purposes as artificial silk and film manufacture and may also be nitrated to yield cellulose nitrate of the so-called ½-second variety satisfactory for lacquers and other products requiring low viscosity cellulose nitrate. Still another objective is the realization of a cellulose of the desired low viscosity from various kinds of wood pulp, cotton linters, and similar cellulosic material while not only substantially preserving the original suitability of such material for conversion into cellulose derivatives but also enhancing its color or whiteness so that solutions of its derivatives are of improved color or clarity.

The present invention involves subjecting cellulose fiber of the appropriate character to the action of aqueous hydrogen peroxide solution under conditions conducing to the desired drastic lowering of the solution viscosity of the fiber. I have found that hydrogen peroxide solution is surprisingly effective in lowering the viscosity of cellulose fiber especially when the treatment of the fiber with the solution takes place at moderately elevated temperature and that even very dilute hydrogen peroxide solution, for instance, solutions so dilute as not to affect the fiber viscosity appreciably at about room temperature, may be made to function as highly effective viscosity-lowering agents at moderately elevated temperature. Aside from the desired viscosity-lowering effect on the fiber to be had from hydrogen peroxide solution, such solution notably improves the color of the fiber, as attested by the greater clarity and freedom from color possessed by solutions of cellulose derivatives prepared from the low viscosity fiber; and there is, moreover, no need of washing residual hydrogen peroxide from the fiber, since it leaves no undesirable residues of any kind on the dried fiber. In this connection, it might be noted that many commercial grades of hydrogen peroxide solution contain stabilizers against decomposition of the hydrogen peroxide; and in the event that a stabilized hydrogen peroxide solution is employed herein, it is desirable to select a solution whose stabilizer leaves no undesirable residues in the cellulose or the cellulose derivatives prepared therefrom. There are available commercially stabilized hydrogen peroxide solutions containing stabilizers of this sort.

In the case of bulk pulp, which requires a comparatively large amount of hydrogen peroxide solution for substantially uniform wetting or suspension of all the fibers, it is generally desirable for reasons of economy to use dilute hydrogen peroxide solution and to heat the pulp in admixture with such solution until the desired viscosity-lowering effect on the fibers has been realized. Thus, an aqueous hydrogen peroxide solution of only about 0.05% to 0.20% strength may serve as the reagent in which cellulose fiber is suspended at about 5% to 10% stock consistency and made to acquire a markedly reduced viscosity, provided that the solution is heated to a temperature of, say, about 60° to 80° C. for the requisite period of time. Unless the fiber is treated with the dilute hydrogen peroxide solution at appropriately elevated temperature, the solution has little effect on the viscosity of the fiber, except over very long periods of time. On the other hand, it is possible to accomplish a pronounced lowering of the viscosity of the fiber in a reasonable or satisfactory period of time even at room temperature when a hydrogen peroxide solution of suitable concentration is maintained in contact with the fiber. It is necessary in such latter instance to use hydrogen peroxide solution of at least 0.75% strength in order to realize the desired marked reduction in fiber viscosity in a reasonable period of time in the case of sheeted fiber; and the use of such stronger solution is, as hereinafter mentioned, preferred in the case of sheeted pulp. On the other hand, it is preferable to work with dilute hydrogen peroxide solution, that is, of 0.05 to 0.20% strength, at elevated temperature more especially in the treatment of bulk pulp, which requires a comparatively large amount of solution to be put into substantially uniform suspension and thus to be substantially uniformly transformed into the finished low viscosity cellulose product, as it is a comparatively inexpensive matter to treat large amounts of pulp in bulk or suspension form in open tanks and to heat and maintain the suspension at elevated temperature for a period of time appropriate to the production of the desired low viscosity cellulose product. When the pulp is suspended in bulk form in the hydrogen peroxide solution, the pulp may then be sheeted directly from such solution, that is, with some dilution with water, if desired, but without a washing operation, and the sheet thus dried in the presence of hydrogen peroxide. In the case of pulpboard or waterleaf paper, it is possible to effect a substantial uniform wetting of the sheet with a comparatively small amount of hydrogen peroxide solution, say, about 10% to 50%, based on the dry weight of fiber, wherefore, it becomes quite practical in such case to work with hydrogen peroxide solution upwards of about 0.75% strength. As already indicated, when such comparatively strong hydrogen peroxide solution is applied to the fiber, it is possible to reduce the solution viscosity of the fiber markedly even at room temperature. Thus, by the mere expedient of air-drying a sheet wet with the strong hydrogen peroxide solution, one may arrive at a dried sheet having a solution viscosity amounting to only a small fraction of the initial or starting viscosity. However, when sheeted fiber is used, it is usually desirable to dry the sheet material comparatively rapidly and continuously as in a hot-air chamber and/or on hot drier drums. This means that the sheet may be kept wet with the hydrogen peroxide solution for such a short period of time that dilute solution will not produce the desired viscosity-lowering effect even at elevated temperature. Accordingly, when sheeted fiber is dried at elevated temperature promptly after its wetting with the hydrogen peroxide solution, it is necessary to apply solution of a strength upwards of about 0.75% so as to combine the effect of both hydrogen peroxide concentration and elevated temperature in getting the necessary rapid viscosity-lowering action on the fiber in the short period of time allotted therefor. The heating of the fiber in the presence of the hydrogen peroxide hence takes place in the preferred embodiments of the process hereof whether the fiber is treated in bulk with dilute solution in large amount or is treated in sheet form with more concentrated solution in limited amount.

I shall now give various examples of the process hereof as applied to various forms of wood pulp and conducted under various conditions.

*Example I.*—Bleached sulphite pulp derived from hardwood (e. g. such hardwood or mixed hardwoods as birch, beech, and maple) was suspended as a 6% pulp suspension in an aqueous solution of hydrogen peroxide containing 2% hydrogen peroxide, based on dry weight of pulp. The suspension was heated to 70° C. and kept at such temperature for one hour. At the end of such treatment, the pulp, which originally had a viscosity of 2.4, showed a viscosity of only 0.27. Such a pulp may be converted into alkali-cellulose, which is xanthatable substantially without ageing into viscose or cellulose xanthate solutions such as compare in viscosity to those currently used in the manufacture of artificial silk and regenerated cellulose films. The resulting low viscosity pulp is preferably sheeted into the usual pulpboard prior to being subjected to the steps of viscose-making.

It might be noted that when the foregoing treatment of pulp with hydrogen peroxide solution is repeated excepting that the pulp suspension is kept at 25° C., there is no material reduction in the viscosity of the pulp even when the time of treatment is considerably prolonged. Indeed, the viscosity of the pulp after a treating period of six hours is 2.2; and only about 2% to 3% of the total peroxide content of the suspension has been consumed. This goes to show how important the factor of elevated temperature is in bringing about the desired sharp reduction in the viscosity of the pulp when dilute hydrogen peroxide solution is employed.

*Example II.*—Bleached spruce wood pulp of high alpha cellulose content, specifically, about 94%, and having a viscosity of 5.5 was treated under the very same conditions as those given in Example I. The resulting pulp product had a viscosity of 0.4. The original pulp, which was of a quality suitable for nitration, is thus transformed into a low viscosity fiber better adapted for conversion into nitrocellulose such as enters into lacquers and other products wherein the quality of low viscosity is a prime requisite. Moreover the hydrogen peroxide treatment improves the color and clarity of solutions prepared from the nitrated pulp. The low viscosity fiber may be shredded or formed into pulpboard or waterleaf paper prior to nitration.

*Example III.*—Pulpboard similar to that ordinarily used for viscose-making but consisting of bleached sulphite pulp derived from hardwood and having a viscosity of 2.4 was used as raw material. The board or sheet was sprayed on both faces with aqueous hydrogen peroxide solution of 3% strength in amount to acquire 1.2% hydrogen peroxide based on the weight of dry pulp. Such an amount of solution causes a substantially uniform impregnation or wetting of the sheet. When the sheet was air-dried and then heated for an hour at 70° C., it displayed a viscosity of 0.22 and its whiteness was measurably enhanced. A similar treatment was performed with hydrogen peroxide solution of 1.5% strength with an incorporation into the sheet of only 0.6% hydrogen peroxide, based on the weight of dry pulp. The resulting product also had a very low viscosity, namely, 0.32. The low viscosity sheets produced in both cases responded to xanthation extremely well without ageing of the soda cellulose prepared therefrom.

*Example IV.*—Pulpboard consisting of bleached hardwood sulphite pulp was sprayed on both faces with hydrogen peroxide solution of 0.75% strength in amount to add to the board or sheet 30% of such solution, based on the weight of dry pulp. It might be noted that the board or sheet, being composed of substantially unbeaten pulp, is quite absorptive and thus imbibes the solution rapidly throughout its body as the solution is being sprayed or distributed substantially uniformly over its surfaces. Promptly after the spray treatment, that is, only a few minutes after the spraying of the solution thereonto, the sheet was exposed for only a short while to a temperature of about 70° C., in consequence of which the viscosity of the sheet fell from an original value of 2.4 to 0.55 and was thus transformed to a cellulose product capable of being xanthated without ageing of the soda-cellulose prepared therefrom to yield satisfactory viscose syrups. It might be noted that the viscosity of soda-cellulose such as is ordinarily produced for viscose-making ranges from 0.35 to 0.5 and that such viscosity range applies to soda cellulose crumbs after they have been aged. The hydrogen peroxide-treated cellulose product of the instant example or cellulose products similarly treated to acquire a viscosity of about 0.5 to 0.6 are xanthatable without ageing of the soda-cellulose prepared therefrom into viscose syrup of viscosity quality similar to that of the viscose syrup prepared from the usual aged soda cellulose crumbs.

*Example V.*—Pulpboard consisting of bleached hardwood sulphite pulp was sprayed on both faces with hydrogen peroxide solution of 1% strength in amount to infuse into the board or sheet 40% of such solution, based on the weight of dry pulp. After keeping the moistened sheet for several hours at 20° C., it was found that its viscosity had dropped from an original value of 2.4 to 0.67. This latter treatment shows that it is possible to reduce the viscosity of pulp to only a small fraction by maintaining the pulp in contact with appropriately concentrated hydrogen peroxide solution at room temperature for a substantial period of time. When similar pulp in bulk form was suspended in hydrogen peroxide solution under similar conditions of time, temperature, and hydrogen peroxide concentration, it was found that the viscosity had undergone practically like reduction. In such latter case, however, a tremendous excess of hydrogen peroxide solution is necessary in order to promote the desired uniformity of fiber treatment, for instance, solution in amount giving 5% to 10% stock suspensions. It is hence preferable, as already indicated, to apply weaker hydrogen peroxide solution to bulk pulp and to rely upon the factor of elevated temperature in transforming the pulp to the desired low viscosity product. Assuming, however, that a low temperature treatment, for instance, a room temperature treatment, is to be performed on the fiber, it may be of advantage to employ hydrogen peroxide solutions of 2% to 3% or even greater strength in attaining very low viscosity products, for instance, products of a viscosity ranging from 0.1 to 0.2, in a reasonable period of time, say, in an hour or only a few hours.

*Example VI.*—Waterleaf paper consisting of bleached wood pulp having a viscosity of 1.0 was used as raw material. Wood pulp of such viscosity may be prepared by adopting the appropriate conditions of pulping the raw wood in sulphite cooking liquor and/or of bleaching the pulp, or by subjecting preliberated wood pulp to suitable chemical refining or purifying treatments, for instance, digestion of the pulp in alkaline liquor followed by bleaching of the pulp under appropriate conditions. It is thus seen that the starting pulp, although possessing a viscosity of about 1.0, might have an alpha cellulose content like that of the usual bleached sulphite pulp of much higher purity, for instance, an alpha cellulose content upwards of about 94%. Waterleaf paper made of pulp of such viscosity was treated with hydrogen peroxide solution of 1.5% strength in the amount of 60%, based on the dry weight of the paper, which amount of solution caused a substantially uniform wetting of the paper body. Upon being air-dried, the paper had a viscosity of 0.12. The dried paper was cut into small pieces and nitrated as ordinarily. Not only was the nitration yield good and the retention of nitrating acid upon centrifugation of the nitrated product satisfactorily low from a commercial standpoint, but the nitrated product was comparable in its viscosity to so-called one-half second nitrocotton. When the foregoing treatment of waterleaf paper is conducted with suitable heating of the solution-impregnated paper in the course of its drying or afterwards, it is possible to induce a further reduction in the viscosity of the paper.

The foregoing examples, which embody various applications of the present invention, lend themselves to modification. Thus, sheeted cellulose fiber, such as waterleaf paper or pulpboard, may be treated with hydrogen peroxide solution as the sheet is on the papermaking machine or is issuing from the papermaking machine or a rolled accumulation; and the solution may be incorporated into the sheet in various ways, for instance, by spraying or brushing it onto the sheet surfaces or transferring it thereto from the periphery of a so-called "kissing" roll or by running the sheet through a bath of the solution and then squeezing out or otherwise removing excess solution. In any event, it is desirable that substantially the whole sheet body be substantially uniformly wetted with the solution and that the sheet be wetted with hydrogen peroxide solution of at least 0.75% strength in amount to associate with the sheet at least 0.2% hydrogen peroxide, based on the dry weight of fiber. Should the sheet be dried at elevated temperature promptly after being wetted with the solution in the amount of about 20% to 50%, based on the dry weight of fiber, it is preferable to use peroxide solution of about 2% to 3% or even greater strength in order to induce the desired rapid and sharp reduction in viscosity of the sheet within the short period of time during which the solution stays in the sheet. On th. other hand, when the sheet is kept moistened with the hydrogen peroxide solution for a substantial period of time, say, one or more hours, it is possible to get a similar or even sharper reduction in viscosity of the sheet with a solution of less strength, for instance, one of about 1.0% to 1.5% strength. By starting with sheeted pulp or paper of a viscosity of, say, 1 to 2 and properly coordinating the factors of time, temperature and strength of hydrogen peroxide solution, it is possible to produce a product of a viscosity downwards of 0.2, for instance, in the range of 0.1 to 0.15, which product gives, as already indicated, nitrocellulose of the one-half second variety. The low viscosity product is also of value in making various other cellulose derivatives.

The improvement in the color as well as the marked viscosity reduction effected on cellulose by the hydrogen peroxide treatment hereof is of considerable importance when the cellulose fiber or pulp would otherwise be unacceptable for conversion into high grade nitrocellulose or other cellulose derivatives. Thus, waterleaf paper consisting of bleached hardwood sulphite pulp ordinarily unacceptable for nitration purpose on account of the inferior color and the high viscosity of the nitrocellulose obtainable therefrom may be so greatly improved with respect to color and viscosity by the hydrogen peroxide treatment hereof as to become an acceptable raw material for nitration.

It is to be noted that the hydrogen peroxide treatments hereof were described as being applied to bleached wood pulp. While such treatment is attended by a color improvement of the pulp in the high whiteness range or zone, it should not be confounded with bleaching operations ordinarily performed on unbleached wood pulps or the like. The fact is that unbleached wood pulps or the like can be bleached to a high degree of whiteness much more economically with bleaching agents, such as the hypochlorites, than with hydrogen peroxide. Moreover, unbleached wood pulps or the like contain a substantial percentage of ligneous matter, which is highly consumptive of hydrogen peroxide, so that when hydrogen peroxide solution is applied to such pulps the hydrogen peroxide is to a large extent consumed by reaction with the ligneous matter rather than in reducing the viscosity of the pulp. Indeed, unless a very large amount of hydrogen peroxide, based on pulp, is used in the treatment of unbleached pulp, one cannot produce the low viscosity cellulose products herein desired. It is hence distinctly preferable from the standpoint of economy to apply the hydrogen peroxide treatments hereof to substantially bleached cellulose fiber or pulp, as hereinbefore described.

In some instances, acids, such as acetic and sulphuric, may be added to the hydrogen peroxide solution with which the cellulose fiber is being treated. Acetic acid may, for instance, be added when the fiber is to undergo subsequent acetylation, in which case it is unnecessary to wash the fiber prior to acetylation. An advantageous conjunctive use of hydrogen peroxide and acetic acid is disclosed with particularity in my application Serial No. 77,612, filed of even date herewith. When sulphuric acid is used conjunctively with the hydrogen peroxide, the fiber need not be washed when it is intended for acetylation or nitration, as these esterification reactions take place in the presence of sulphuric acid as a catalyst. However, when the fiber is to be converted into cellulose xanthate or cellulose ethers, acid reagents, such as acetic and sulphuric acids, should be washed or otherwise removed from the fiber. In such latter instances, that is, when the fiber is to be converted into cellulose derivatives in the presence of alkali, the treatment with hydrogen peroxide solution may take place in the presence of alkali so as to favor preservation of the alpha cellulose content of the fiber. Thus, the fiber may be treated with hydrogen peroxide dissolved in slightly alkaline aqueous medium so as to retain the alpha cellulose content of the fiber, as in an instance where the treated fiber is xanthated and the presence in the fiber of alkaline residues from the hydrogen peroxide treatment is unobjectionable by reason of the fact that xanthation is performed in an alkali-cellulose mixture.

In characterizing the hydrogen peroxide treatment hereof as being effected at elevated temperature, I mean that the treatment takes place at a temperature appreciably above room temperature but preferably somewhat below the boiling point of the hydrogen peroxide. Thus, I have mentioned a temperature of 70° C. as that at which the treatment is conducted, but this temperature might range from 50° to 70° C. or be somewhat lower. Of course, when a sheet of paper or pulpboard is being continuously treated, the wet sheet may be dried at higher temperature, say, 100° C. or even higher, for instance, on steam-heated drier drums, which drying operation may take place promptly after the sheet has been wet with the hydrogen peroxide solution or after the wet sheet has been kept for a substantial period at room or somewhat elevated temperature.

The solution usually employed as a standard for measuring the viscosity of cellulose pulp is a cuprammonium cellulose solution of prescribed cellulose concentration, the viscosity being determined by measuring the time of efflux of a definite volume of such solution under standard conditions through an orifice of standard size. The solution viscosity of fiber as hereinbefore given in absolute C. G. S. units or poises is determined by measuring the viscosity of a solution of 6 grams of fiber in a cuprammonium solution composed of 225 cc. of 28.6% ammonia water containing 9 grams of so-called "copper hydrate" powder which is in reality basic copper nitrate corresponding in composition to the formula $Cu(NO_3)_2.3Cu(OH)_2$. The C. G. S. unit is employed because it is definite, denoting a viscosity 100 times that of water at 20° C., wherefore, a cuprammonium cellulose solution of standard composition identifying a fiber as having a solution viscosity of 10 is 1000 times as viscous as water at 20° C. The method of determining or measuring solution viscosity of cellulose fiber used herein is that described by me in much greater detail in "Industrial and Engineering Chemistry", Volume 23, page 136, 1931; and inasmuch as the description of my viscosity-testing method as given in that publication affords the particular criterion or test used herein, it is to be understood that my reference to such description is intended to incorporate such description as a part hereof.

I claim:

1. A process which comprises treating cellulose fiber of the nature of wood pulp and cotton with a hydrogen peroxide solution of at least 0.75% strength while controlling the time and temperature of such treatment to effect a marked reduction in the viscosity of such fiber and then drying the fiber in the presence of the hydrogen peroxide of such treating solution.

2. A process which comprises wetting cellulose fiber of the nature of wood pulp and cotton with a hydrogen peroxide solution of at least 0.75% strength and drying the fiber under heat in the presence of the hydrogen peroxide of such wetting solution to promote the viscosity-reducing action of the hydrogen peroxide on the fiber.

3. A step which comprises wetting a sheet of cellulose fiber with hydrogen peroxide solution of at least 0.75% strength and then drying the sheet in the presence of the hydrogen peroxide of such wetting solution.

4. A step which comprises wetting a sheet of cellulose fiber with hydrogen peroxide solution of at least 0.75% strength in amount to associate with the sheet at least 0.2% hydrogen peroxide, based on the dry weight of fiber, and then drying the sheet in the presence of the hydrogen peroxide of such wetting solution.

5. A process which comprises wetting a sheet of cellulose fiber with hydrogen peroxide solution, ageing the so-wetted sheet, and drying the sheet in the presence of the hydrogen peroxide of such wetting solution.

6. A process which comprises wetting a sheet of cellulose fiber with hydrogen peroxide solution and drying the sheet in the presence of the hydrogen peroxide of such wetting solution.

7. A process which comprises wetting a sheet of cellulose fiber with a hydrogen peroxide solution of at least 0.75% strength, drying the sheet thus wetted, and controlling the time and temperature of contact of the solution with the sheet before it is completely dried to effect a marked reduction in the viscosity of the sheet.

8. A process which comprises wetting a sheet of cellulose fiber with hydrogen peroxide solution of at least 0.75% strength, keeping the sheet wet with the solution for a substantial period of time, and drying the sheet in the presence of hydrogen peroxide.

9. A process which comprises wetting a sheet of cellulose fiber with a hydrogen peroxide solution of at least 0.75% strength, keeping the sheet wet with the solution for a substantial period of time, drying the sheet in the presence of the hydrogen peroxide, and subjecting the sheet to elevated temperature at some stage of the process after the sheet has been wet with such solution.

10. A process which comprises suspending cellulose fiber of the nature of wood pulp and cotton in bulk form in a dilute aqueous solution of hydrogen peroxide at sufficiently elevated temperature to induce marked lowering of the viscosity of the fiber and drying the fiber in the presence of the hydrogen peroxide of the aqueous suspending solution.

11. A process which comprises treating substantially bleached cellulose fiber with hydrogen peroxide solution while coordinating the temperature and strength of solution and time of treatment to accomplish a marked reduction in the viscosity of the fiber, drying the fiber in the presence of the hydrogen peroxide of the treating solution, and converting the resulting dried fiber into cellulose derivatives.

12. A process which comprises suspending substantially bleached cellulose fiber of the nature of wood pulp or cotton in a dilute aqueous solution of hydrogen peroxide at a temperature appreciably above room temperature until a marked lowering in the viscosity of the fiber has been effected, drying the fiber in the presence of the hydrogen peroxide of the aqueous suspending solution, and converting the resulting dried fiber into cellulose derivatives.

13. A process which comprises wetting a sheet of cellulose fiber with hydrogen peroxide solution, drying the sheet in the presence of the hydrogen peroxide, coordinating the temperature and strength of hydrogen peroxide solution and the time of its contact with the sheet before it is completely dried to effect a marked reduction in the viscosity of the sheet, and converting the fiber in the dried sheet into cellulose derivatives.

14. A process which comprises suspending cellulose fiber in an aqueous solution of hydrogen peroxide, sheeting the fiber from such suspension in hydrogen peroxide solution, and drying the sheet in the presence of the hydrogen peroxide of such suspending solution.

15. A process which comprises treating cellulose fiber of the nature of wood pulp and cotton with sulphuric acid admixed with a solution composed substantially of water and hydrogen peroxide; and esterifying the fiber so treated.

16. A process which comprises treating cellulose fiber of the nature of wood pulp and cotton with an acid admixed with a solution composed substantially of water and hydrogen peroxide to induce marked lowering of the solution viscosity of such fiber.

17. A process which comprises treating cellulose fiber of the nature of wood pulp and cotton with sulphuric acid admixed with a solution composed substantially of water and hydrogen peroxide; and acetylating the so-treated fiber.

18. A process which comprises treating cellulose fiber of the nature of wood pulp and cotton with sulphuric acid admixed with a solution composed substantially of water and hydrogen peroxide; and nitrating the so-treated fiber.

GEORGE A. RICHTER.